United States Patent Office 3,322,140
Patented May 30, 1967

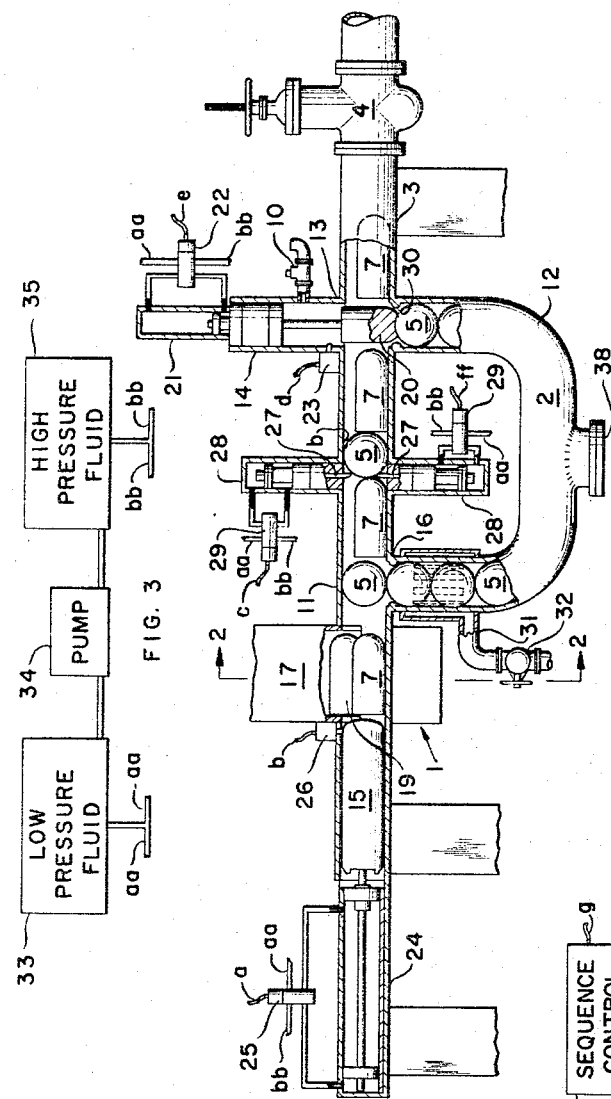

3,322,140
PIPELINE CAPSULE LAUNCHER
Paul R. Scott, Houston, Tex., assignor to Shell Oil Company, New York, N.Y., a corporation of Delaware
Filed July 16, 1965, Ser. No. 472,526
8 Claims. (Cl. 137—268)

The present invention relates to the transportation of capsules in fluids flowing through pipelines and more particularly, to a capsule launcher designed to continuously inject capsules into pressurized pipelines having fluids flowing therein.

Transportation of various materials by pipelines has long been recognized as an attractive means of overland transportation because of the economics inherent in pipelining methods which are usually much greater than the comparable cost usually attributed to the transportation of these materials by rail or road. While pipelining was originally thought to have limited application, the growth of science and technology in this area has led to ever-increasing applications.

Originally, pipelining was usually reserved to the transportation of fluids, such as water, oil, gas, etc., in pipelines or aqueducts designed for that purpose. Further, it was recognized that miscible fluids could be combined with one another to form a new fluid, generally neutonian in character and having characteristics different than either of the two fluids so combined, but yet quite acceptable for pipelining. However, from these simple situations, more complex, multiphase flow of two immiscible fluids were developed and from there, pipelining expanded into the flow of solids suspended in fluids in pipeline operations. In this latter method, solid materials were incorporated into the flowing fluid stream in particulate form and various techniques, such as particle size distribution, have been adopted to stabilize the suspensions. Typically, commercial applications of the transportation particulate solids suspended in fluids are the movements of coal, gilsonite and the like.

While some of the above techniques of pipelines have been employed with meritorious commercial success, there are major limitations on those techniques. These stem partly due to the incompatability of the materials to be transported with the fluid flowing through the pipeline; incompatibility factors such as high specific gravity of the material relative to the pipeline fluid, direct damage to the materials from the contact with the pipeline fluid, difficulty in separation of the materials from the pipeline fluid at the delivery point and difficulty of stabilizing materials in the fluid flowing through the pipeline, have severely limited pipelining operations.

With the advent of cheap plastics, the encapsulation of materials to be transported by pipeline with a coating of plastic allows most of the incompatability factors mentioned above to be avoided. This is possible since the specific gravity can be adjusted and direct contact of the materials to be transported with the pipeline fluid can be avoided. In addition, the plastic coating or capsules offers a degree of protection to the material to be transported from impact damage. Thus, the concept of encapsulation in plastics opens a whole new field of commodities which may be transported by pipelining and considerable research effort has been devoted to the investigation of capsule flow through pipelines, for example, see "The Pipeline Flow of Capsules" by G. W. Hodgson and M. E. Charles in the Canadian Journal of Chemical Engineering, vol. 41, pp. 43 (1963).

With the blossoming of the relatively new concept of transporting materials encapsulated in plastics through pipelines into commercial reality, the development of special apparatus and methods are necessary to facilitate such techniques. The instant invention is concerned with a launching mechanism whereby capsules can be continuously introduced into a pressurized pipeline having fluids flowing therein. The unique launcher is designed for use with pressurized pipelines without the use of cumbersome valves or switching trunk lines which can introduce hydraulic shock into the fluids flowing through the pipeline. A Canadian Patent No. 673,280, issued to Hodgson, teaches the introduction of capsule by using a pair of parallel trunk lines interposed between two sections of the main line which can be independently cut in and out of the pipelining through a multiple valve arrangement. His technique is to open the non-flowing line and load it with capsules and close the same before establishing flow therethrough from the main line to sweep the capsules from the loaded trunk line. This is typical of other prior art, such as U.S. 3,158,888, issued to Ericson, which teaches the use of a "lock" type arrangement, whereby the capsules or pigs loaded into the lock and sealed therein prior to being released to the pressures in the pipeline proper.

Accordingly, it is an object of the present invention to provide an automatic launching mechanism by which capsules can be continuously introduced into a pressurized line without the use of complicated "valve and lock" means as disclosed in the prior art.

Another object of the invention is to provide a novel launching mechanism using circulating valve means to prevent the escape of fluids from pressurized pipelines when injecting capsules into the pipeline.

A further object is to provide a novel launcher for introducing capsules into pipelines which introduces a minimum hydraulic shock.

Broadly, the invention is concerned with a method and launching apparatus for continuously inserting solid to semi-solid capsules and the like into pressurized pipelines without the escape of pressurized fluid therefrom. Basically, the invention employs a circulating loop having a conduit communicating between the pressurized pipeline and the circulating loop. Ball valve means circulating in the loop to prevent the escape of pressurized fluid from the pipeline and the circulating loop has loading means for introducing capsules into the loop between the ball valve means in the low pressure portion and injecting them into the pipeline on the pressurized side of the loop communicating with the inside of the pipeline.

To better understand the nature of the present invention, attention is directed to the drawings wherein:

FIGURE 1 serves a vertical elevation, partly in section of the circulating loop and its cooperating mechanisms; and FIGURE 2 is a vertical section along line 2—2 of FIGURE 1 showing the capsule feed mechanism;

FIGURE 3 is a box diagram of the standard hydraulic pump system with high and low pressure reservoirs; and FIGURE 4 is a box diagram of a sequence control unit for the operation of the launcher.

FIGURE 1, an elevation of the launcher partly in section, shows the internal detail of the launcher 1. Basically, the launcher is composed of a circulating loop 2 which is connected with a pipeline (not shown) through conduit 3, preferably through gate valve 4. When gate valve 4 is in the open position, high pressure fluid from the pipeline is able to pass through the valve and through conduit 3 to the circulating loop 2. However, the fluid from the pressurized pipeline is restricted to a minor portion of loop 2 by a pair of elastomer sealing balls 5 which engage the walls of loop 2 in sealing engagement thereby preventing any fluid from the pressurized pipeline from escaping into other portions of the loop. In operation, the elastomer sealing balls 5 are circulated through circulating loop 2 by hydraulic rams and solid to semi-solid capsules 7 can be interposed between adjacent sealing balls in a low pressure portion of the loop 2 and carried with the cycling sealing balls 5 into the high pressure portion of the loop 9 from which capsules 7 are ejected in conduit 3 and from there into the pressurized pipeline through gate valve 4.

By referring to the very simple description of the operation of the capsule launcher 1 above, it can be readily appreciated that solid to semi-solid capsules 7 can be continuously injected into a pressurized pipeline having fluid flowing therethrough without loss of any appreciable fluid from the pipeline and without introducing appreciable hydraulic shock into the pipeline. Further, the introduction of gas into the pressurized pipeline can be avoided by the use of a liquid trap such as liquid trap 10 shown in FIGURE 1 which is located at a high point in the launcher 1 where the gas is likely to collect.

The main functional components of this system include the circulating loop 2 described above with its conduit 3 connecting it to the pipeline, a loading mechanism for introducing capsules 7 into the circulating loop and two hydraulic ram systems which move the elastomer sealing balls 5 through loop 2 in a circulatory pattern.

Circulating loop 2 is composed generally of a straight length of pipe 11 with a gently curving U-shaped conduit 12, forming the continuous loop 2. At the pipeline pressure end of the loop 2 (high pressure end), is a cross-joint 13 where the U-shaped conduit 12 connects with pipe 11 and conduit 3 which are two axially aligned arms of the cross-joint 13. One end portion of U-shaped conduit 12 and a cylindrical ram housing 14 are the other two axially aligned arms of the cross-joint 13. Pipe 11 extends rearwardly from the cross-joint 13 beyond the point that the opposite end of U-shaped conduit 12 interconnects therewith in T-joint 16 and is fabricated to form portions of the capsule feed mechanism is ram housing for the launching ram 15, rearwardly of T-joint 16.

Just ahead of launching ram 15, between it and the T-joint 16, the U-shaped conduit 12 makes with pipe 11, a capsule feed conduit 17 is connected to pipe 11 and communicates with the inside thereof. Capsule feed conduit 17 is generally rectangular in shape and adopted to feed capsules into pipe 11 so that their longitudinal axis generally coincide with that of the pipe 11. The capsule feed conduit 17 is filled with capsules 7 having their longitudinal axis transverse of that of the feed conduit and as they move downwardly through the conduit and into pipe 11 just ahead of launching ram 15, they are generally axially aligned with pipe 11, which can best be seen in FIGURE 2. So that other capsules will not interfere with the launching ram 15 as it moves forward, toward the circulating loop 2 through pipe 11, a pair of retractable fingers 18 are provided near the end of the portion of conduit 17 connected to the pipe 11. These launching fingers restrict the flow of capsules 7 into the breech 19 of the feed mechanism. When fingers 18 are sequentially operated through their retracted positions, one capsule 7 in the feed conduit 17 moves down into breech 19 of the launcher 1.

After capsule 7 enters the breech 19 of capsule launcher 1, it is in position to be moved through the launcher mechanism by launching ram 15 and into the pipeline through which it is to be transported. As can be seen in FIGURE 1, capsule 7 in breech 19 is interposed between the launching ram 15 and elastomer sealing ball 5. Sealing ball 5 directly ahead of capsule 7 in breech 19, is forced into this position from the conduit 12 by chain-reaction of the ball recovery plunger 20 pushing another sealing ball 5 in the opposite end of the conduit 12 which is completely filled with the circulating sealing balls 5. After the ball recovery plunger has forced the upstream sealing ball 5 into conduit 12, it retracts into the cylindrical housing 14, clearing pipe 11 of its obstruction. This reciprocating action of the plunger is effected through a hydraulic cylinder 21 which is double acting and controlled by a solenoid valve 22. When the plunger 20 is in the retracted position, microswitch 23 is depressed and the launching ram 15 is able to operate and ready to move capsule 7 through its initial increment in pipe 11 as it proceeds through the launcher 1 to the pipeline.

At this point, the hydraulic ram 15, actuated by its hydraulic cylinder 24 through the action of the associated solenoid valve 25, moves axially through pipe 11 toward capsule 7 in breech 19. This movement causes a depression of microswitch 26 which retracts the two hold back fingers 27 through their associated hydraulic actuating cylinders 28 by the operation of their respective solenoid valves 29 clearing the passageway through pipe 11 of the hold back fingers.

The purpose of the hold back fingers 27 is to prevent the sealing balls 5 in pipe 11 from being forced toward the launching ram 15 by the high pressure fluid entering the launcher from the pressurized pipeline through gate valve 4 and conduit 3. Since in their retracted position, hydraulic launching ram 15 has already moved forward engaging capsule 7 in the breech 19 and forcing it against sealing ball 5 ahead of the capsule, the pressure from the pipeline will not be able to move the capsules with the sealing balls interspaced therebetween toward the breech against the ram pressure. As ram 15 proceeds through the breech 19, it forces capsule 7 in the breech into a position just aft of the holding fingers 27 as can be seen in drawing 1. At this point, microswitch 26 detects the maximum extent of the launching rams travel and reactuates the holding fingers which move into pipe 11 to prevent the pressure from forcing the balls 5 and capsules 7 back toward breech 19 as launching ram 15 retracts rearwardly toward its actuating cylinder. After the launching ram 15 has reached the full extent of its forward travel, a sealing ball 5 located in pipe 11 directly below the ball recovery plunger 20 which is in the retracted position. As the launching ram retracts through the breech far enough to clear the end of the conduit 12 joined to pipe 11 with T-joint 16, the ball recovery plunger is extended through the action of its solenoid valve 22 actuating hydraulic cylinder 21 forcing sealing ball 5 directly beneath the plunger into the upstream end of conduit 12 of circulating loop 2 which forces another sealing ball 5 into pipe 11 directly behind the capsule 7 that has been moved up and ahead of breech 19.

Normally, the conduit 12 of circulating loop 2 is completely full of sealing balls 5 which are retained in the loop by small ears 30 adjacent to the conduit's connection into pipe 11 in joints 13 and 16. The downward movement of plunger 20 forces the sealing ball beneath it into the conduit, past the small ears 30 which prevent the ball from springing back into pipe 11 directly ahead of the capsule it was in front of. At this point, ball recovery plunger retracts into the cylindrical housing 14 and another capsule is fed into the breech 19 from the capsule feed conduit 17 so that the cycle can be repeated. As the cycle is repeated, the capsules are moved through pipe 11 and into conduit 3 from which it is pushed into the pipeline by subsequent capsules.

As can be seen in FIGURE 1, the sealing ball 5 directly ahead of the hold back finger 27 forms a seal with its contiguous pipe 11 structure since the ball is slightly oversized for pipe 11. Because the sealing ball is retained by fingers 27 behind it, the fluid pressure from the pipeline cannot force the ball backwards toward the breech 19, nor can the fluid escape from around the periphery of the ball pressing tightly against the inside surface of pipe 11 thereby forming a fluid impermeable seal. A second seal is formed by the balls 5 in the upstream end of U-shaped conduit 12 of circulating loop 2. The internal diameter of conduit 12 is the same as that of pipe 11 and the sealing balls 5 pushed in the conduit 12 directly below ball recovery plunger 20, form a second seal with the conduit 12 to prevent escape of the pressurized fluid from the pipeline. Only a small amount of fluid is trapped between adjacent balls pushed into the U-shaped conduit 12 of circulating loop 2 by the recovery plunger 20 and this fluid can be collected in sump 31 and routed back to the pipeline through valve 32 and an appropriate pump (not shown). Alternatively, the fluid collected in sump 31 could be fed into the breech 19 of the launcher 1 in order to reduce the amount of entrained gaseous fluid moving through the launcher with the capsules 7 and sealing ball 5 train. Of course, this does not present any great problems since a liquid trap mounted at a high point in the system such as that shown mounted on cylindrical housing 14 (trap 10), allows any gases to be vented from the launcher without loss of pressurized liquid from the pipeline.

Having described the general operation of the launcher, reference is made to FIGURE 3 which shows a block diagram of a source of pressure fluid for the operation of various hydraulic units of the launcher mechanism. The box diagram includes a low pressure reservoir 33 which is connected to the return lines *aa* of all the hydraulic units and the high pressure pump 34 connected to a high pressure fluid reservoir 35 which provides a high pressure fluid to the pressure side *bb* of each hydraulic unit. Pump 34 is usually a bypass pump which has sufficient capacity to maintain the necessary pressure in the high pressure reservoir which would usually be equipped with an accumulator (not shown).

From the discussions above, it can be appreciated that the launcher 1 requires that various operating components be timed with reference to one another. For example, the ball recovery plunger 20 cannot be obstructing the flow of the capsules through the pipe 11 as the launching ram 15 is advanced through breech 19 of the launcher since it would effect a mechanical lock breaking the launching mechanism. To avoid such "locks," a common sequencing control unit, see FIGURE 4, is connected through electrical leads to double acting solenoid valves on each of the hydraulic units as well as microswitches 23 and 26. The purpose of the sequencing unit is to control the sequential operation of the various hydraulic units so that the others will be in the proper position when others are cycling. The sequence control unit 36 is designed to operate the mechanical-hydraulic portions of the launcher as well as the fingers 18 in the feed conduit 17 through their associated hydraulic cylinders 37 and solenoid valves 38. For the sake of simplicity, the wires to the various solenoid valves and sequence control unit 36 have been broken and similar leads on the control unit and respective solenoid valve designated by letters *a* through *g* as can be seen in FIGURES 1, 2 and 4.

Having fully described the invention, it should be appreciated that various modifications to the circulating ball launcher can be effected without changing its principal of operation. Further, additional microswitches can be added to the various reciprocating parts to prevent any possibility of jamming the mechanism of the launcher. Further, some of the mechanism, such as hold back fingers 27, may be simplified by using spring loaded mechanical lugs which pop out after the passage of sealing balls 5 to restrict their backward movement.

Also, it can be seen in the drawing that the launcher is designed for capsules having relatively uniform axial lengths so that the sealing balls are properly located in the mechanism for the next succeeding sequential step, such as that of the recovery plunger 20 forcing the balls into U-shaped conduit 12 of circulating loop 2. However, the launching mechanism may be modified with telescoping parts both in conduit 12 and pipe 11 between the hold back fingers 27 and the connections between the respective ends of conduit 12 so that capsules of different lengths can be employed in the launcher. It is preferred that the capsules be slightly smaller than the inside diameter of pipe 11 and elongated, as shown.

The sealing balls 5 are slightly larger than the pipe 11 and U-shaped conduit 12 so that they will form an effective seal in pipe 11 and conduit 12. These balls should be selected for their wear characteristics and plastic qualities and could be conveniently selected from rubber, plastic, etc. Further, a manhole 38 is supplied in conduit 12 of circulating loop 2 through which the circulating sealing balls may be replaced in the circulating loop during temporary shut-down of the launcher 1.

In viewing FIGURE 1, it also should be appreciated that capsules 7 are of a solid to semi-solid nature with low axial compressibility since their axial compression would cause the sealing balls to assume an improper relationship with the operating members of the launcher.

While the invention has been described with reference to elongated capsules as shown in the drawings, it should be appreciated that spherical capsules could also be used in the launcher without difficulty so long as the sealing balls would be properly oriented under the ball recovery plunger each time it is cycled. Of course, it would be preferred that the spherical capsules be somewhat smaller than the inside diameter of the circulating loop and of low compressibility as mentioned above.

I claim as my invention:
1. A capsule launcher for continuously inserting solid to semi-solid capsules into pressurized pipelines comprising:
 (a) a circulating loop;
 (b) a length of conduit connecting said circulating loop and a pressurized pipeline for fluid communication therebetween;
 (c) a plurality of ball valve means positioned in the bore of said circulating loop, said ball valve means being larger in diameter than the diameter of said bore thereby effecting a fluid tight seal between the periphery of said ball valve means and the walls of said bore;
 (d) capsule-loading means communicating with a low pressure portion of said circulating loop which is operable to introduce capsules into said circulating loop in said portion; and
 (e) means for circulating said ball means through said circulating loop so capsules inserted in said low pressure portion of said loop are carried by the circulation to a high pressure portion of said loop communicating with said pressurized pipeline where they are discharged into said length of conduit and thence into said pipeline.

2. The capsule launcher according to claim 1 wherein the circulating loop is composed of a straight length of pipe and a U-shaped piece of pipe interconnected therewith to make a continuous integral loop for circulation of the ball valve means through said U-shaped piece of pipe and a portion of said straight length of pipe.

3. A capsule launcher according to claim 2 wherein the length of conduit connecting the circulating loop to the pressurized pipeline includes a gate valve connected therein to close-off said circulating loop from said pipeline.

4. A capsule launcher according to claim 1 wherein the ball valve means are spherical elastomer balls.

5. A launcher according to claim 2 wherein the capsule loading means include a capsule feed conduit and a breech axially aligned with the straight length of pipe and communicating therewith.

6. A launcher according to claim 1 wherein the means for circulating said ball means consists of two sequentially timed ram means oriented to push said ball valve means through said circulating loop in a stepwise fashion.

7. A launcher according to claim 1 wherein the circulating loop has holdback means to prevent hydraulic pressures from the pipeline from circulating the ball valve means in a pattern reversed to that effected by the mechanical means for circulating them.

8. A launcher according to claim 1 wherein the launcher includes an automatic sequencing unit for stepwise operation of its various components.

No references cited.

M. CARY NELSON, *Primary Examiner.*

MICHAEL O. STURM, *Assistant Examiner.*